United States Patent [19]
Dahlin et al.

[11] 3,743,948
[45] July 3, 1973

[54] PULSE TRAIN SORTER

[75] Inventors: Robert K. Dahlin, Garden Grove, Calif.; Harold J. Arnold, Falls Church, Va.; Hugh M. Cleland, Laguna Hills, Calif.; Robert B. Lyon, Downey, Calif.; Robert W. Polkinghorn, Huntington Beach, Calif.

[73] Assignee: North American Rockwell Corporation, El Segundo, Calif.

[22] Filed: Dec. 4, 1969

[21] Appl. No.: 881,974

[52] U.S. Cl. ............... 328/119, 328/37, 328/56, 328/105
[51] Int. Cl. ...................... H03k 5/00, H03k 5/159
[58] Field of Search ............... 343/5 DP; 328/105, 328/157, 37, 56, 119; 333/29

[56] References Cited
UNITED STATES PATENTS
3,051,928  8/1962  Sullivan ........................ 333/29 X
3,391,403  7/1968  Phillips, Jr. .................... 343/5 DP
3,167,738  1/1965  Westerfield ..................... 343/5 DP
3,346,849  10/1967  Jones et al. .................... 343/5 DP Primary Examiner—Malcolm F. Hubler
Attorney—L. Lee Humphries, Charles F. Dischler and Sidney Magnes

[57] ABSTRACT

A plurality of incoming electrical signals is to be analyzed in order to sort out pulse-trains of interest. This is achieved by directing the signals along a transmission-device that has a number of readout-points, so that individual pulse-signals travel past these readout-points; resultant status-signals at the readout-points indicating the instantaneous presence or absence of pulse-signals at these points. When the status-signals indicate the presence of a pulse-train of interest, segments of the electrical-signal are routed to a suitable utilization device.

15 Claims, 2 Drawing Figures

PULSE TRAIN SORTER

BACKGROUND

As is well known, "radar" is a technique emitting electro-magnetic energy; and when a portion of this energy is reflected from a target radar circuitry obtains the distance to and direction of the target. Radar has developed many uses; among these being searching, detecting, tracking, guiding, and the like.

It therefore becomes important to know what type of enemy-originated radar signals are being used, so that suitable action, jamming, decoying, generating intentionally-spurious signals, etc. may be initiated. Unfortunately, however, the very multiplicity of radar signals — and their close or overlapping frequency spectra — increase the difficulty of identifying particular types of radar signals.

OBJECTS AND DRAWINGS

Figure 1:
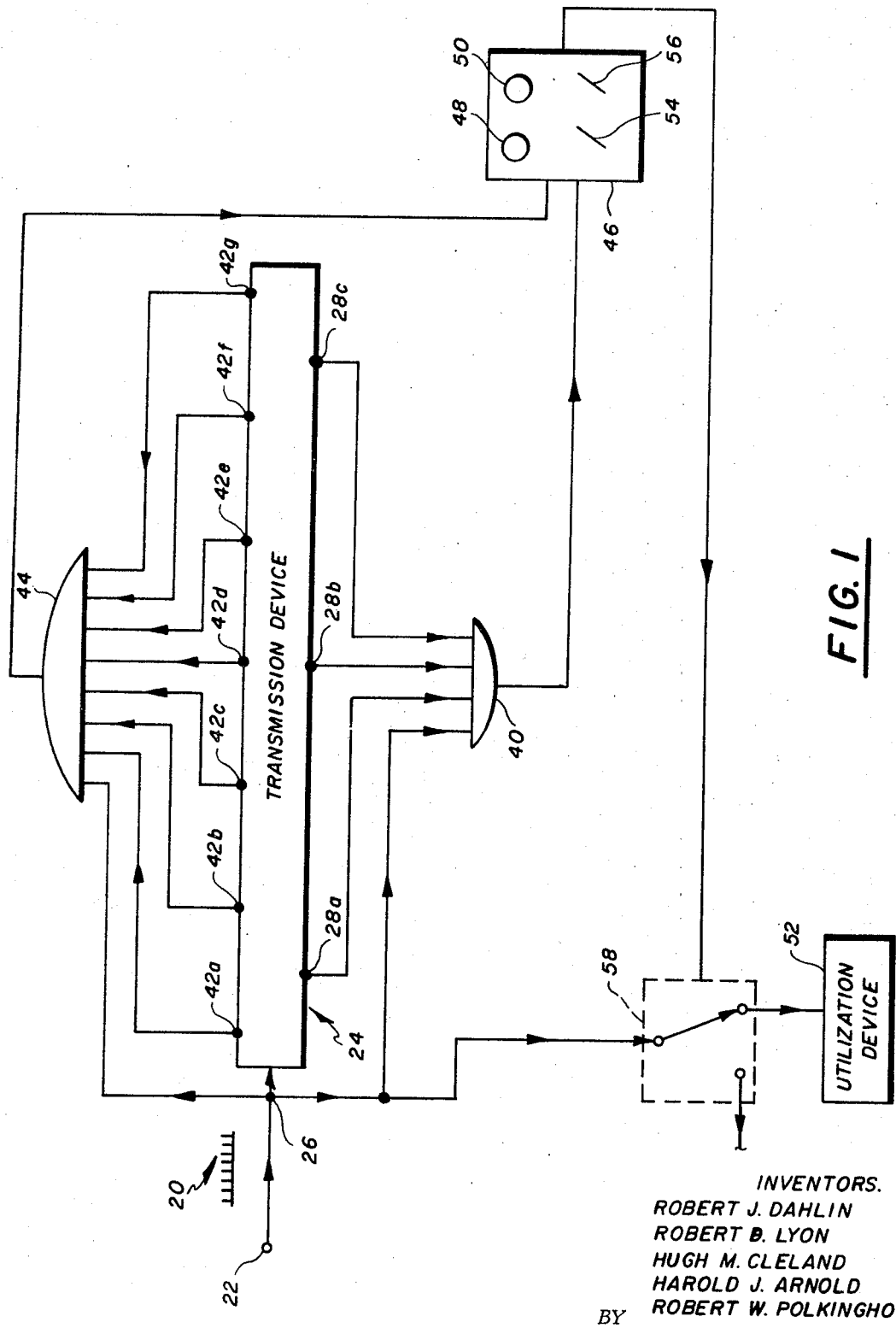
Figure 2:
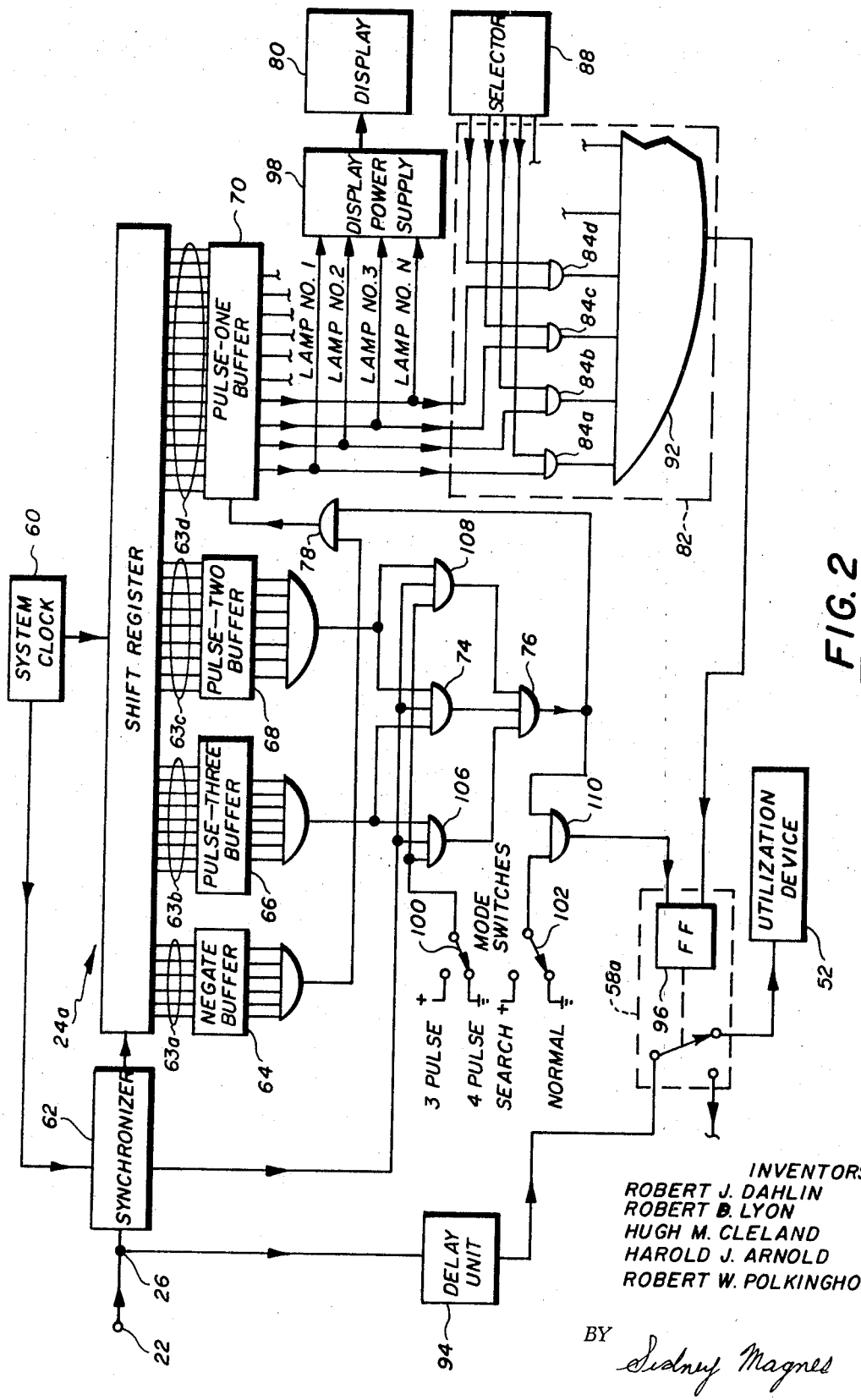

It is therefore an object of the present invention to provide an improved arrangement for identifying and "sorting" radar-type signals. The attainment of this object, and others, will be realized from the detailed description, taken in conjunction with the drawings, of which:

FIG. 1 shows a basic circuit; and
FIG. 2 shows an improved embodiment.

INTRODUCTION

Most radar systems transmit a burst or "pulse" of energy (radio energy, light energy, or the like); and then have a quiescent period during which the reflected energy is received and analyzed. After this, a new burst or energy is emitted; and the process is repeated. The duration of the burst relative to the pulsing period is known as its "duty-cycle;" and a graph of the emitted radiation would look like a series of pulses separated by a series of waiting-intervals — this graph (and the emitted radiation waveform) being known as a "pulse-train."

A study of such a pulse-train would show a given number of pulses (or cycles) per second, this being known as pulse-repetition-frequency -frequency (PRF); a given pulse-length, or burst duration; and a given length for the quiescent period, this being known as the "pulse-repetition-interval" (PRI). Each radar system tends to have its own duty-cycle, pulse-repetition frequency, pulse-repetition interval, and other characteristics; one of these being the "radio-carrier" frequency at which the pulse-train is transmitted. For the purpose of simplifying the following discussion, the actual radio-carrier frequency is not considered, it being well known in the electronics art to obtain and use the overall "envelope" (RF amplitude-time history) of the pulse-train.

An aircraft, ship, missile, or the like — at any given instant — may be exposed to a plurality of radar pulse-trains — each train having its own individual characteristics as discussed above. In general, the various radar-signals will be coming from different radar stations; one of these may be tracking the target, another may be trying to measure the target's size; another may be trying to disrupt some of the target's electronic operations; etc. Therefore it is often desirable — and occasionally necessary — to be able to detect, identify, measure, digitize, sort, select, separate, compare and/or correlate the various impinging pulse-trains. In the past these operations have generally required computers having tremendous memories, which of course, is an extreme disadvantage if the equipment is to be airborne.

SYNOPSIS

Broadly stated, all the incoming signals are directed along a transmission-device having a plurality of readout-points, so that a plurality of individual pulse-signals march past the readout-points Each readout-point produces a status-signal in accordance with the instantaneous presence or absence of pulse-signals at these points. It is known that a pulse-train of interest should produce similar status-signals at selected readout-points, and a coincidence-circuit is used to detect this condition. Once the coincidence condition is known to exist, co-acting circuitry flashes an indicator, and simultaneously directs the newest pulse-signal of that train to a utilization device.

Circuitry is shown for detecting the pulse-train even if some of its individual segments are mis-timed, or even missing; and other circuitry permits analyzing several pulse-trains of interest.

FIG. 1 illustrates an electronic circuit for practicing the invention. Assume here that an incoming pulse-train has been converted to a pulse-train electrical signal 20, each segment thereof having substantially-identical characteristics corresponding to the pulses of the pulse-train. Pulse-train signal 20 is applied to an input-terminal 22; and is then applied to a transmission-device 24. As will be shown later, transmission-device 24 may take several forms; but for the time being, it is only necessary to realize that each segment of pulse-train-signal 20 produces an individual "pulse-signal" that travels along transmission-device 24.

It should be noted that transmission-device 24 has an input-point 26, and has "readout points" 28a, 28b, 28c, etc. These will be discussed later.

Due to the presence of pulse-train-signal 20, a plurality of individual pulse-signals corresponding to segments of pulse-train signal 20 travel along transmission-device 24; the individual pulse-signals being separated by a given distance that depends — in part — upon the pulse-repetition-frequency of pulse-train signal 20, and depends — in part — upon the characteristics of transmission-device 24. As a result, a plurality of pulse-signals will travel along transmission-device 24, like timed lights on an electric advertising sign; and — for specific conditions — at some given instant there will be pulse-signals located at point 26 and at readout-points 28a, 28b, 28c.

If an instantaneous set of "status" signals is obtained from selected readout-points, this set of status signals will indicate the presence (or absence) of pulse-signals at each of these readout-points; and the status-signals may be applied to an AND circuit 40 of FIG. 1. AND circuit 40 acts like a "coincidence" arrangement; and, in the present case, the set of similar status-signals produces a triggering-signal at the AND circuit output; all of the necessary input signals being present and coincident at the input terminals of the AND circuit.

If transmission-device 24 takes the form of a well-known "tapped" delay-line, each "tap" point becomes a readout-point; and the output wire at the tap-points will apply the status-signals from the tap-points to the input-terminals of AND circuit 40.

It is well known that electrical signals tend to change characteristics during transmission; i.e., during transmission along transmission-device 24, the pulse-signals may become pregressively weaker, progressively more distorted, etc. However, the pulse-signal characteristics are not important in the above circuit, which merely needs to indicate presence or absence of pulse-signal.

It should be noted that the segment of the pulse-train signal appearing at input-point 26 is relatively undistorted, and that it is used as a status-signal from input-point 26.

To recapitulate, if the incoming pulse-train-signal 20 and the transmission-device 24 have suitable characteristics and readout-points, a set of similar readout or status-signals from select points of the transmitting-device will be time-coincident; and this set of status-signals will cause AND circuit 40 to produce a triggering-signal. Thus, for the described conditions, the triggering-signal from AND circuit 40 indicates the presence of a given pulse-train.

For convenience of explanation, the term similar status-signals will be construed to mean positive readout-signal that correspond to the presence of pulse-signal.

As the pulse-signals move along transmission-device 24, the instantaneous "positive" status-signals are of course terminated; but it should be noted that a new grouping of pulse-signals is formed — and as this new grouping of pulse-signals moves along transmission-device 24, the individual pulse-signals thereof eventually simultaneously reach input-point 26 and readout-points 28. Now a new triggering-signal is produced by AND circuit 40, as described above.

Thus, a given pulse-train will produce cyclic triggering-signals.

It is apparent that a triggering-signal will be produced only at a given instant, so that a short "time-window" is obtained; and this time-window will be further discussed later.

It will be realized that, with the above location of tap-points 28, a second pulse-train signal (corresponding to different pulse-train) would not have its pulse-signals suitably spaced to produce a set for similar status-signals that cause AND circuit 40 to produce a triggering-signal. However, for this second pulse-train, a different set of tap-points (42a, 42b, 42c, 42e, 42f, 42g ...) would produce a second set of status-signals suitable for energizing a second AND circuit 44 that would — in turn — produce a second triggering-signal — thus producing a different time-window, for a different pulse-train of interest.

In the above way, the disclosed arrangement produces various triggering-signals at the presence of particular pulse-trains of interest.

In order to indicate the presence of such impinging pulse-trains, the triggering-signals from AND circuits 40 and 44 are applied to an indicating arrangement 46 that comprises, in the illustration, two lamps — 48 and 50. The indicator-apparatus 46 is such that the triggering-signal from AND circuit 40 illuminates indicator-lamp 48, and the triggering-signal from AND circuit 44 illuminates the other indicator-lamp 50. In this way, the disclosed arrangement indicates the presence of particular pulse-trains; and the disclosed principles may be used to cover any desired range of pulse-trains.

Having detected a pulse-train (i.e., the presence of a particular pulse-train), it may now be desirable to sort-out this particular pulse-train from others; and to apply it to a utilization device 52. This result may be achieved as follows. Referring back to indicator 46, it may be seen that FIG. 1 shows this to have two selecting-switches, 54 and 56 — which are associated with lamps 48 and 50 respectively. If lamp 48 is illuminated (indicating the presence of a given pulse-train) its corresponding switch 54 may be set; and every time a trigger-signal illuminates lamp 48, selecting-switch 54 may be set; and every time a trigger-signal illuminates lamp 48, selecting-switch 54 directs a selecting-signal to a selection-device 58.

Selection-device 58 is preferably a fast-acting electronic switching circuit that acts essentially as a single-pole double-throw switch; so that when energized, it directs the incoming undistorted segment of the pulse-train signal from input-point 26 to utilization-device 52. Thus, in the presence of a set of coincident pulse-signals, the disclosed circuit directs the latest pulse (present at point 26) to a utilization-device 52 that may store it, analyze it, display it, compare it with other signals, and/or perform other desired operations.

It was previously pointed out that the pulse-signals in transmission-device 24 might have been seriously degraded in amplitude, waveform, duration, rise-time, etc.; so that, in the interest of precise analysis, the undistorted segment of the pulse-train signal at input-point 26 is applied to utilization-device 52.

Summarizing, when a pulse-train of interest impinges upon the disclosed apparatus, a set of corresponding pulse-signals appear simultaneously at readout-points such as 26, 28a, 28b, and 28c; and their coincident presence at AND circuit 40 produces a trigger-signal that causes lamp 48 to light and causes the undistorted pulse-signal at point 26 to be applied to a utilization device. An instant later, the pulse-signals have traveled along transmission-device 24; and the above condition no longer exists. Therefore, lamp 48 is extinguished; and selection device 58 switches itself, to bypass the presently-impinging signals (if any) to some other utilizing device — if so desired.

Of course, in actuality, the various segments of a pulse-train signal arrive in such rapid succession that lamp 48 and selection device 58 seem to be on continuously.

In the presence of the second of the above-described pulse-trains, tap-points 28 would not produce a trigger-signal; but tap-points 42 would cause lamp 50 of indicator 46 to be lighted. Setting selecting-switch 56 would activate selecting-device 58 in such a timed manner that segments of the second pulse-train at point 26 would be applied to utilization-device 52, for sorting, analysis, display, comparison, and/or the like.

In this way, the disclosed arrangement indicates the presence of a pulse-train of a particular pulse-repetition frequency; and directs sequential segments of the selected pulse-train to a utilization-device; bypassing the other impinging signals to other equipment — as may be desired. It thus "sorts" the given wave-trains from others; but it should be noted that the actual detection of the given wave-train is also a form of sorting.

It should be noted that if the two above-described pulse-trains signals are impinging simultaneously upon the disclosed apparatus, each individual coincident condition will cause a corresponding lamp to light; and that under no circumstances would a pulse-train activate the wrong lamp. Thus, a suitably-marked lamp or suitable equipment can indicate whether one or more pulse-trains of interest are present; and by setting the proper selection-switch, a particular pulse-train is directed to the utilization-device.

It will be apparent that the use of more readout-points will provide more status-signals, and better resolution between pulse-train signals that differ by only a very small amount; but it has been found that using as few as four readout-points provides quite satisfactory identification.

It will be obvious that a given readout-point may happen to be so positioned that it will act to produce readout-signals for more than one pulse-train signal; and this condition becomes more common with an increase in the number of pulse-trains of interest. For example, in FIG. 1 readout-point 28c might coincide with readout-point 42d, but the coincidence-circuits 40, 44 obviate spurious signals.

The transmitting-device 24, as indicated above, may take the form of a tapped delay-line. By selecting a delay-line having a suitable delay interval, the resultant pulse-signals may be satisfactorily spaced for low pulse-repetition signals; but as the pulse-repetition increases, it becomes impracticable to obtain delay-lines with adequate delay and quality. This shortcoming is overcome in an embodiment to be now described.

EMBODIMENT OF FIG. 2

The embodiment shown in FIG. 2 is similar to that previously described. In FIG. 2, transmission-device 24a takes the form of a "shift-register" — an electronic circuit that is fully described in many publications.

The shift register acts somewhat like a row of closely-space up-ended dominoes. As explained in the "domino theory", when the first domino falls, it downs its subsequent neighbor; when this neighbor falls, it in turn downs its subsequent neighbor; and so on down the line of dominoes. The "knock-down" perturbance proceeds at a given rate that is established by the spacing of the dominoes, their stability, and other factors. It will be realized that at any given instant, it would be possible to obtain an indication (say by high-speed photography) that would tell an observer where the perturbance was located.

The shift-register circuit operates in somewhat the same manner as the above-described dominoes. The circuit comprises a plurality of electronic circuits known as "flip-flops" (FF) that have two states (corresponding to the erect an knocked-down states of the dominoes). These states may be designated as the "ZERO" state and as the "ONE" state; these designations having originated from the output signal at a given output-terminal of the FF circuit.

The shift-register circuit of FIG. 2 operates somewhat differently than the domino-theory discussed above, in that each FF passes its individual state along to its subsequent neighbor. For example, if the first FF is in its ZERO state, it passes a "ZERO" signal to the next FF; this FF, in turn, eventually passing along its new ZERO signal. Similarly, if the first FF were in its ONE state, a ONE signal would pass along the shift-register.

Therefore, if a pulse-train signal (in the form of ONES and ZEROS) is applied to the first FF of the shift-register, the grouping of pulse-signals would pass down the shift-register — retaining its original format (similar to a light/dark message traveling along an electric advertising sign). It should be noted that in this case the pulse-signals comprise "ONES" and "zeros;" and do not have the characteristics of the original segments of the pulse-train.

The passing of signals along the shift-register is controlled by so-called "shifting signals" that cause each FF to shift its instantaneous state to its subsequent neighbor. Since electronic circuitry may operate practically instantaneously, the shift-register can handle much higher pulse-repetition-frequencies than the previously-discussed delay-line. The shift-register has another advantage over delay-lines, in that its component flip-flop circuits have output terminals that inherently indicate the instantaneous ZERO/ONE state of the flip-flop, thus producing the desired readout-signals.

In FIG. 2, transmission-device 24a takes the form of a shift-register; this being driven by shifting-signals from a well-known "system clock" 60 that produces a plurality of synchronized timing-signals that are precisely timed and maintained. Various types of timing-signals have selected repetition-rates, wave shapes, polarities, durations; etc.; so that these timing-signals can be used for various purposes. Given timing-signals are applied to shift register 24a, to serve as shifting-signals so that as the shift-register is periodically energized; the shifting occuring at a given rate controlled by the shifting-signals from system-clock 60. (This corresponds to the fall-down rate in the above-described domino theory)

Referring again to FIG. 2, the incoming pulse-train is converted (by means that are not shown) to an electrical pulse-train signal 20 that is applied to input terminal 22. As each segment of the pulse-train signal is applied to a synchronizer 62, the synchronizer performs the following functions.

First of all, the synchronizer converts the segments to a ONE/ZERO form, as by means of a digitizer circuit or the like. Secondly, since portions of the incoming signals often have amplitudes that may be either too large or too small, one of the functions of synchronizer 62 is to modify all of the incoming signals to an acceptable amplitude — as by means of clipping, attenuation, amplification, etc. Another function of synchronizer 62 is to feed the pulse-train signals to shift-register 24a at specific times. For example, it was pointed out that the system-clock 60 energizes shift-resister 24a periodically; and it is therefore desirable that each new portion of the pulse-train signal be applied to the shift-register in time to be transmitted along it. Therefore, synchronizer 62 receives the incoming pulse-train signal; and upon receipt of a proper timing-signal from system-clock 60, applies the first pulse-signal to the first FF of the shift-register, which then — under the control of the shifting-signals from system-clock 60 — transmits that pulse-signal along transmission-device 24a.

As soon as the first FF of the shift register has passed on its instantaneous pulse-signal, it resets itself, in readiness for another signal from synchronizer 62. The operation of shift-register 24a, as controlled by system-clock 60, is such that it operates at about one or two hundred times as fast as the incoming signals of the pulse-train signal. Therefore, the incoming signals never overload the shift register, which is always ready to receive a new pulse-signal from synchronizer 62.

As discussed previously, the FF portions of transmission-device 24a are inherently adapted to produce output signals corresponding to their instantaneous state (in this case a ONE/ZERO readout-signal indicative of the presence or absence of a pulse-signal in that particular FF). For example, a ONE-state readout-signal may be used as a "positive" status-signal that indicates the presence of a pulse-signal; and a ZERO-state or "negative" readout-signal may indicate the absence of a pulse-signal. Thus, by using FF output signals from a selected group of flip-flops of shift-register 24a and applying these as status-signals to a coincidence-circuit as previously described; a triggering-signal may be obtained from the coincidence-circuit to indicate the presence/absence of a given wave-train.

In general only selected pulse-trains are of interest; and therefore only selected portions of the shift-register need have output-terminals or readout-points capable of producing status-signals. FIG. 2 (for reasons to be discussed later) shows a plurality of status-signal wires arranged into four groups 63a, 63b, 63c, and 63d; and connected to circuit identified as "Negate Buffer" 64, "Pulse-Three Buffer" 66, "Pulse-Two Buffer" 68, and "Pulse-One Buffer" 70 — these being well known buffer-amplifiers, multiple-input OR circuits, or the like. The "negate" buffer will be discussed later; the other designations merely implying that — at a given instant — the first pulse-signal of a group would have traveled to the shift-resister portion connected to buffer-one, the second pulse-signal of the group would have traveled to the shift-register connected to buffer-two, an that the third pulse-signal of the group would have traveled to the portion of the shift-register connected to buffer-three — the instantaneously-arriving segment-signal being at input-point 26. As discussed above, this arrangement produces a time-window for that particular pulse-train.

For a simplified heuristic example, assume that shift-register 24a has 650 flip-flop elements; that the pulse-signals entering shift-register 24a are shifted to subsequent FF elements of the shift-register at 2-microsecond intervals; and that the pulse-train has a pulse-repetition-interval of 400 microseconds.

Consider now the first pulse-signal of the group under consideration; and assume that it entered the shift-register 1,200 microseconds ago. At the shifting-rate of one shift every 2 microseconds, the first pulse-signal would have undergone 600 shifts (1200/2); and would now be located in the FF numbered 600; and this FF would be applying a positive status-signal to pulse-one buffer 70.

Consider now the second pulse-signal of the pulse-train. Since it occurred 400 microseconds after the first pulse-signal, the second pulse-signal entered the shift-register 800 microseconds ago (1200-400); and has undergone 400 shifts (800/2). The second pulse-signal would therefore be located in the FF numbered 400; and this FF would be providing a positive status-signal for pulse-two buffer 68.

Similarly, the third pulse-signal would have entered the shift-register 400 microseconds ago (800-400); would have undergone 200 shifts (400/2); and would be located at the FF number 200 — and this FF would be applying a positive status-signal to pulse-three buffer 66.

It should be noted that at this same instant, a fourth pulse-signal is present at synchronizer 62; and may be used as a status-signal.

For reasons to be discussed later, rather than applying all of the status-signals to an AND circuit — as was illustrated previously — the circuit of FIG. 2 shows that the status-signals from buffers 66 and 68 and from synchronizer 62, are applied to a coincidence-circuit, such as an AND circuit 74. (It should be noted that buffer 70 is not connected to AND circuit 74.)

Since at the instant under consideration, there are simultaneous pulse-signals at buffers 66, 68, and synchronizer 62, each produces a positive status-signal; and these three similar status-signals appear simultaneously at AND circuit 74. Therefore AND circuit 74 produces a triggering-signal; and the triggering-signal from AND circuit 74 is applied to an OR circuit 76, whose energizing output-signal is then applied through a gate-circuit 78 that applies an activating-signal to buffer 70.

It was pointed out previously that during the instant under discussion, there was also a pulse-signal at FF 600; and that this produces a positive status-signal at buffer 70. Thus, the activating-signal from gate-circuit 78 is produced simultaneously with the status-signal from FF 600; and therefore, buffer 70 — acting as a coincident circuit or as a gate-circuit — produces a signal that a given pulse-train is present in shift-register 24a. In the illustration of FIG. 2, the output-signal from buffer 70 controls the illumination of a particular indicating lamp of a lamp-display 80.

At a subsequent instant, say 400 microseconds later, the original set of pulse-signals has been shifted along the shift-register; a new pulse-signal has appeared at the synchronizer — so that each of the discussed pulse-signals has advanced to a subsequent one of the FF locations discussed above.

This new condition produces another set of similar status-signals that re-light the indicator lamp. Thus, a given pulse-train energizes a corresponding indicator (lamp, buzzer, etc.).

Due to the fact that the incoming signals often tend to vary slightly, it is quite possible that a subsequent set of pulse-signals may be at slightly offset FFs at a next corresponding instant, and thus might not produce a desired trigger-signal and indication. To overcome this problem, the time-window may be opened slightly as follows. As indicated, a number of adjacent FF readout-points are sub-grouped; and the sub-groups are connected by wire-bundles 63 to buffers 64, 66, 68, and 70 that isolate the various readout-points from each other, and isolate the various sub-groups — but still permit each FF to produce useful status-signals. In this way, a slightly-off incoming signal will still activate its proper buffer, so that the time-window is opened slightly, to detect the pulse-train despite variations therein.

If an incoming pulse-train has a different frequency, it is apparent that — as discussed in connection with FIG. 1 — other FF elements would produce positive status-signals; that these status-signals could produce positive status-signals; that these status-signals could be applied to a corresponding coincidence circuit, similar to that indicated at 74; and that the new coincidence-circuit could produce signal for illuminating a different lamp. Thus, different pulse-trains can be detected.

Alternatively, the above-discussed sub-grouping of status-wires may be used to detect a different pulse-train. It will be recalled — from FIG. 2 — that, for a given pulse-train, a FF status-signal applied to buffer 70 will be accompanied by simultaneous status-signals applied to buffers 66 and 68. Therefore, the particular status-signal applied to buffer 70 may be used to control which lamp is lighted, while the simultaneous status-signals from buffers 66 and 68 and synchronizer 62 can cause gate-circuit 78 to apply an activating -signal to buffer 70.

It will be apparent that for a second different pulse-train, a different FF status-signal applied to buffer 70 will be accompanied by simultaneous different status-signals applied to buffers 66 and 68 and synchronizer 62. As discussed above, the particular status-signal applied to buffer 70 may be used to light another lamp, while the simultaneous status-signals from buffers 66, 68, and synchronizer 62 cause gate-circuit 78 to apply an activating-signal to buffer 70.

Similarly, other pulse-trains will light corresponding indicating-lamps. In this way, suitable grouping of the status-signal wires can be used to widen the time-window and/or detect the presence of a plurality of pulse-trains. One early model used a lamp-display 80 having 64 lamps for identifying that many pulse-trains.

As pointed out above, once the incoming pulse-train has been detected, it has already been sorted-out from the other incoming signals; but it is often desirable to further sort it out for purposes of analysis, display, etc; and the circuit of FIG. 2 accomplishes this result as follows. It will be recalled that a particular status-signal applied to buffer 70 was used as a control-signal to a particular lamp; and this same control-signal is also applied to a selection-arrangement 82, which operates as follows.

Selection-arrangement 82 comprises a plurality of AND circuits 84a, 84b, 84c, etc. — corresponding to the lamps of lamp-display 80; and the control-signals — from buffer 70 — that illuminate the various lamps, are applied to corresponding AND circuits 84.

Corresponding input terminals of AND circuits 84a, 84b, 84c, etc. are also connected to the output of corresponding selecting-switches of a selector 88 (corresponding to switches 54, 56 of FIG. 1).

In operation, assume that a given status-signal applied to buffer 70 produces a control-signal that illuminates lamp number one, and this same control-signal is also applied to AND circuit 84a. If switch number one of selector 88 is properly set, it applies a selection-signal to AND circuit 84a. Since AND circuit 84a now receives two simultaneous input signals, it produces an output signal that is applied to OR circuit 92; the selecting-signal from OR circuit 92 being applied to a selection-device 58a (corresponding to selection-device 58 of FIG. 1) that selects the particular segment-signal being applied at that instant to input-point 26.

It will be realized that the segment-signal at input-point 26 is an undistorted portion of the original pulse-train; and contains the original pulse-amplitude, pulse-width, rise and decay times, waveform shape, etc. (This is not necessary true of the pulse-signals in transmission-device 24a, since these pulse-signals may merely be "spikes" that carry ZERO/ONE information.)

The actual separating out, or sorting, may be accomplished as follows. The selecting-signal from OR circuit 92 is applied to selection-device 58a; more specifically to circuit 96 known as a "one-shot multivibrator" — this circuit having the characteristic that when energized it will momentarily change its state, and then return to its original state. One-shot multivibrator 96, in turn, is connected to an electronic switch that acts like a single-pole double-throw switch.

When the selecting-signal from OR circuit 92 is applied to the one-shot FF 96, the selecting-signal energizes the FF; and the net result is that the instantaneous segment-signal at input-point 26 is applied to utilization-device 52. The one-shot multivibrator then immediately reverts to its quiescent state; and all other pulse-signals are then bypassed around utilization-device 52.

While electronic-circuitry operates practically instantaneously, there is a minute — but finite — delay encountered by signals traveling through complex circuitry; i.e., the operation of selection-device 58a may occur an instant later than the presence of the segment-signal at input-point 26. Therefore it may be desirable to insert a delay-unit 94 between selection-device 58a and input-point 26.

Thus, the segment-signal at input-point 26 is now available to be separated-out from the other signals at the input terminal.

Utilization-device 52 may be a visual monitor; whereupon it could produce a visual display of the incoming waveform. Alternatively, it may be an analyzing circuit, computer, or the like; the result of this being an analysis of the selected pulse-train.

It should be noted that it is not essential to use a lamp or indicator display such as 80; because when selector 88 is suitably set, the apparatus then sorts out and analyzes the particular pulse-train of interest.

As described above, the next shifting-signal from system-clock 60 activates the transmission-device 24a to cause each of the pulse-signals to advance to the next-subsequent FF element of transmission-device 24a; and, generally, for a small time-window, no trigger -signal would be produced at this time. However, unless specific provision is made, an illuminated lamp would continue to be lighted or to glow. To eliminate this, lamp display 80 may be energized by a lamp power-source 98 that automatically resets itself, or extinguishes all the lamps at a given rate — such as 20 times per second. The result is that when a lamp is on, it actually flickers; but this flicker is not descernable to the eye. However, when the control-signal from buffer 70 is terminated, the lamp — after extinguishment — is not re-lighted until its associated control-signal is again produced.

When the next set of positive status-signals is produced at the indicated FF elements, another triggering-signal is produced; the same lamp is re-lighted; and the instantaneous segment-signal at input point 26 is again directed to the utilization device 52. In this way, the utilization-device will portray sequential segment-signals of the pulse-train, the display or analyzing circuitry in this way receiving the important pulse-train information; i.e., its duty-cycle, its amplitude, its frequency, etc.

It will be noted that the above explanation of FIG. 2 requires four simultaneous status-signals, in order to produce the desired result. The requirement for four simultaneous status-signals is a fairly stringent requirement, and assures fairly high reliability.

It is known, however, that occasionally — due to various attenuations, interferences, transients, and the like — some of the pulses may be lost, i.e., they arrive at a relatively low amplitude or at a distortion that the synchronizer cannot use. Therefore, the circuit of FIG. 2 contains a provision for utilizing wave-trains of interest, even though some of the pulses have been lost.

To do this, FIG. 2 includes two "mode" switches 100 and 102. Mode-switch 100 is shown at a position identified as the "four -pulse position, which indicates that four simultaneous status-signals are necessary to obtain the desired result; and the above explanation has been given in accordance with this requirement.

If mode-switch 100 is placed in the "three-pulse" position, the circuit operates in the following manner. It now requires the first and fourth simultaneous pulse-signals; in effect conceding that there is a single lost intermediate pulse that is not producing a desired pulse-signal.

The circuitry of FIG. 2 is such that AND circuit 106 is energized by the fourth status-signal (from synchronizer 62), by the third pulse-signal (from pulse-three buffer 66), and by a positive signal produced by mode-switch 100 (which is now in its three-pulse setting). When these three input signals are coincident, they activate AND circuit 106, and OR circuit 76, which produces an energizing-signal at gate-circuit 78 as indicated above. This arrangement obviates the need for the pulse-signal from pulse-two buffer 68.

If, on the other hand, there is a lost pulse which does not produce a signal from pulse-three buffer 66, AND circuit 108 has the following effect. It is energized by the fourth status-signal (from synchronizer 72) by the second pulse-signal (from pulse-two buffer 68); and by the positive signal produced by mode-switch 100 in its "three-pulse" position. Under this condition, the three simultaneous input-signals to AND circuit 108 cause OR circuit 76 to produce an energizing-signal. This mode arrangement obviates the need for a pulse-signal from pulse-three buffer 66.

In this way, mode-switch 100 permits the use of either four simultaneous status-signals or three simultaneous status-signals — providing that the lost pulse-signal is an intermediate one, and not the first or the fourth of a group.

The disclosed circuit, as described above, detects and sorts out a given pulse-train from other signals that are applied to the circuit; but mode-switch 102 may be positioned in its "search" position to produce the following result. The triggering-signals from OR circuit 76 (produced by all sets of coincident status-signals) in addition to being applied to light the various lamps as described previously, is also applied to an AND circuit 110. For normal usage AND circuit 110 is disabled; but for the search-mode of operation, one of its inputs is obtained from the positive potential of the search -position of mode-switch 102. This switch-position thus has the effect of applying every trigger-signal from OR circuit 74 directly to the one-shot multivibrator 96; and therefore, every triggering-signal causes the instantaneous segment-signal at input-point 26 to be applied to utilization-device 52.

It will be noted that if several pulse-trains are received simultaneously by the disclosed circuit, the pulse-repetition-frequency of each pulse-train can be indicated on the lamp-display; and that any desired pulse-train may be selected for application to the utilization device. Thus, the arrangement operates in a "parallel" manner, i.e., it can operate upon all of the incoming pulse-trains simultaneously; sorting out the particular one, or ones, of interest.

It may so happen that one segment-signal of one pulse-train may be at input-point 26 at exactly the same instant as a segment-signal of another pulse-train; and if it should so happen that one of these pulse-trains is being sorted from the other incoming signals, the signal at the input-point will be applied to the utilization-device as a composite of the two separate segments. This is an extremely unusual condition; and will happen very rarely, and then only momentarily for the presence of those particular signals on that given point.

One problem that arises in handling pulse-trains is that of "harmonics" — that is, a signal having a frequency that is twice, thrice, etc. the frequency of the signal of interest. For example, in the illustration used above, it was assumed that there was a pulse-signal at FF elements 200, 400, and 600; these corresponding to a pulse-train having a particular frequency. If a pulse-train having the second-harmonic of this frequency happened to be received; this would mean that there would be a pulse-signal at FF elements 100, 200, 300, 400, 500, and 600. The second, fourth, and sixth of these pulse-signals would cause the apparatus to try to operate as described above; but the result would be erroneous, since it was produced by a harmonic — rather than by the desired signal.

To overcome this effect, "negate" buffer 64 of FIG. 2 is used to pick up status-signals from an early portion of the shift-register. This negate-buffer detects the second (or higher) harmonic pulse -signal on an early sub-group of FFs; and applies a negate-signal to gate-circuit 78. Now, if gate-circuit 78 should happen to receive a triggering-signal from OR circuit 76, as a result of the harmonic-frequency, gate-circuit 78 will be disabled by the negate-signal, and would not activate the indicator lamp or the sorting-circuitry. Thus, the effect of the harmonic frequency is removed. Since this negate -signal is produced only by harmonics, and by all harmonics, a similar negation occurs for higher harmonics.

It is apparent that the negate-signal feature can be pulse-train incorporated into the circuit of FIG. 1.

What is claimed is:

1. Apparatus for detecting at least one given series of pulses having a given frequency, said apparatus comprising:

a transmission-device having an input-point and a plurality of readout-points which are arranged into a plurality of groups containing more than one readout-point;

means for applying a series of randomly time-spaced pulses which includes said given series to said input-point of said transmission-device;

said transmission-device causing each pulse of randomly random series to produce an individual pulse-signal that is transmitted along said transmission-device, the resultant series of pulse-signals in said transmission-device moving along said transmission-device with the same randomly time-spaced separation characteristic that the pulses in said random series have;

means for obtaining a set of status-signals from one of said groups of said readout-points of said transmission-device, for indicating the presence of individual pulses at each readout point in a selected one of said groups, each of said groups having more than one readout-point and less than all of the readout points;

the simultaneous presence of similar status signals at all the readout-points of said one of said groups of readout-points being indicative of the presence of the given series of pulses having the given frequency; and coincidence means, energized by the set of similar status-signals for producing a trigger signal.

2. The combination of claim 1 including:

indicating means, associated with said trigger -signal, for producing an indication of the presence of said given series.

3. The combination of claim 1 including:

selection means, associated with said trigger -signal, for selecting the pulse of said given series at said input point; and means for applying said selected pulse to a utilization-device — whereby a relatively undistorted pulse of said given series is sorted-out.

4. The combination of claim 3 wherein said selection means includes:

an electronic-switch; and means, associated with said trigger-signal, for energizing said electronic-switch for directing said selected pulse of said given series from said input-point to said utilization device.

5. The combination of claim 1 including:

additional means for obtaining a second set of status-signals from a second group of readout-points; and additional coincidence means, energized by said second set of status-signals, for producing a second trigger-signal at the simultaneous occurrence of similar status-signals at said second group of readout-points; and means for causing said second trigger-signal to sort-out a pulse of a second series of pulses having a second frequency.

6. The combination of claim 1 including:

means for causing a harmonic-frequency of said pulse-train signal to produce a negate -signal; and means for causing said negate-signal to negate the effect of said trigger-signal.

7. The combination of claim 1 wherein said coincidence means includes mode-switch means for producing said triggering-signal in the absence of one of said positive status-signals.

8. The combination of claim 1 including indicating-means comprising:

a plurality of indicators; and means, associated with said trigger-signal, for energizing selected indicators at the presence of said given series of pulses.

9. The combination of claim 1 wherein each said groups of read-out points comprises:

a buffer; and a plurality of wires connecting individual readout-points of each of said groups to a respective buffer.

10. Apparatus for detecting at least one given series of pulses having a given frequency comprising:

a shift-register type transmission-device having an input-point and a plurality of readout-points which are arranged into a plurality of groups;

means for applying a series of randomly time-spaced pulses which includes said given series to said input-point of said transmission-device;

said shift-register type transmission -device causing each pulse of said random series to produce an individual digital -type pulse-signal that is transmitted along said transmission-device, the resultant series of pulse-signals in said transmission-device moving along said transmission-device with the same randomly time-spaced separation characteristic that pulses in said random series have;

means for obtaining a set of digital status -signals from one of said groups of said readout-points of said transmission -device, for indicating the presence of individual pulse-signals at said group of readout-points;

the simultaneous presence of a set of similar status -signals at all the readout-points of a said one group of readout-points being indicative of the presence of a given series of pulses of interest;

a like plurality of buffers;

means for connecting individual readout -points of one of said groups to respective ones of said buffers;

means, energized by a set of output-signals from said buffer, for producing an indication signal; and indicating means, associated with said indicating-signal, for producing an indication of the presence of a given series of interest.

11. The combination of claim 10 including:

selection means, associated with said indicating -signal, for selecting the pulse of said given series at said input point; and means for applying said selected pulse to a utilization-device — whereby relatively undistorted pulse of said given series of interest are sorted-out from said random series.

12. The combination of claim 11 wherein said selection means includes:

an electronic-switch; and means, associated with said indicating-signal, for energizing said electronic-switch for directing said selected pulse of said given series from said input.

13. The combination of claim 10 including:

means, comprising said plurality of buffers, for obtaining a second given series of pulses;

means, energized by a second given series of pulses from said buffers, for producing a second indicating -signal; and means, associated with said second indicating -signal, for causing said second indicating -signal to produce an indication of the presence of a second given series of interest.

14. The combination of claim 10 including:

means, comprising an additional buffer, for causing a harmonic-frequency of said given series to produce a negate-signal; and means for causing said negate-signal to negate the effect of said indicating-signal.

15. The combination of claim 10 including:

mode-switch means for producing said indicating-signal in the absence of an intermediate one of said pulses in said given series.

\* \* \* \* \*